US006724139B2

(12) United States Patent
Koizumi

(10) Patent No.: US 6,724,139 B2
(45) Date of Patent: Apr. 20, 2004

(54) CATHODE RAY TUBE HAVING IMPROVED INDIRECTLY HEATED CATHODE

(75) Inventor: Sachio Koizumi, Mobara (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/003,232

(22) Filed: Dec. 6, 2001

(65) Prior Publication Data

US 2002/0117958 A1 Aug. 29, 2002

(30) Foreign Application Priority Data

Dec. 15, 2000 (JP) ....................................... 2000-381300

(51) Int. Cl.[7] .......................... H01J 29/82; H01J 17/24; H01J 29/50; C03C 3/066

(52) U.S. Cl. ....................... 313/482; 313/559; 313/417; 501/79

(58) Field of Search ............................ 313/346 R, 446, 313/482, 559, 481, 457, 417; 501/5, 32, 79, 73, 77

(56) References Cited

FOREIGN PATENT DOCUMENTS

JP 60-185330 a * 9/1985 ............. H01J/1/20
JP 10-312757 a * 11/1998 ............ H01J/29/04

* cited by examiner

*Primary Examiner*—Thomas M. Sember
*Assistant Examiner*—Peter Macchiarolo
(74) *Attorney, Agent, or Firm*—Antonelli, Terry, Stout & Kraus, LLP

(57) ABSTRACT

A cathode ray tube has a cathode and plural grid electrodes fixed by insulating support rods. The cathode is supported within an eyelet disposed within and bonded to a cup-shaped support by a crystallized glass. The cup-shaped support is fixed by the insulating support rods. The crystallized glass is formed by firing a glass composition composed chiefly of zinc oxide, boron oxide, silicon oxide, and magnesium oxide. The crystallized glass exhibits a ratio in intensity of a diffraction peak A to a diffraction peak B in a range from 0.25 to 0.80 in an X-ray diffraction analysis using X-rays of 0.154 nm in wavelength, where the diffraction peak A is in the vicinity of 2θ=25.5°, the diffraction peak B is in the vicinity of 2θ=26.5°, 2θis an angle which a diffracted X-ray beam from a specimen surface makes with an incident X-ray beam.

8 Claims, 7 Drawing Sheets

CATHODE RAY TUBE HAVING IMPROVED INDIRECTLY HEATED CATHODE

BACKGROUND OF THE INVENTION

The present invention relates to a cathode ray tube, and in particular to a cathode ray tube having an indirectly heated cathode using a low-melting-temperature crystallized glass as an insulator for supporting a cathode sleeve.

In general, cathode ray tubes (CRTs), for example, color cathode ray tubes (CPTs) for use in color TV receivers and color cathode ray tubes (CDTs) for use in color display systems, have a phosphor screen formed on an inner surface of a faceplate of a panel portion of their vacuum envelope, a shadow mask having a large number of electron-beam transmissive apertures and disposed within the panel portion so as to face the phosphor screen, an in-line type electron gun housed within a neck portion of the vacuum envelope, and a deflection yoke mounted around the outside of a funnel portion of the vacuum envelope.

In operation of a color cathode ray tube, three electron beams emitted from the electron gun are deflected by the deflection yoke, and then impinge upon the pixels of corresponding colors of the phosphor screen, respectively, after passing through the electron-beam transmissive apertures in the shadow mask, thereby displaying a specified color image on the phosphor screen.

FIG. 4 is a schematic cross-sectional view of a color cathode ray tube for illustrating an example of its overall construction. In FIG. 4, reference numeral 41 denotes a panel portion, 42 is a phosphor screen, 43 is a neck portion for housing an in-line type electron gun 49, 44 is a funnel portion for connecting the panel portion 41 and the neck portion 43 together, and 45 is a shadow mask, which is press-formed so as to be self-supporting and is welded at its periphery to a mask frame 46. Reference numeral 47 denotes a magnetic shield, 48 is a mask suspension mechanism, 50 is a deflection yoke, 51 is an external magnetic correction device, 52 is an implosion proofing band, 53 are panel pins, 54 is a mask assembly, and 55 are stem pins.

In this color cathode ray tube, the panel portion 41, the neck portion 43 and the funnel portion 44 form a vacuum envelope 56, and three intensity-modulated electron beams (one center electron beam and two side electron beams) B are emitted from the electron gun 49 housed within the neck portion 43, and then are deflected in a horizontal direction (the X direction) and a vertical direction (the Y direction) by horizontal and vertical deflection magnetic fields, respectively, generated by the deflection yoke 50 such that the three electron beams B scan the phosphor screen 42 two-dimensionally to reproduce an image. In FIG. 4, reference numeral 57 denotes an internal conductive coating which applies a high voltage introduced via an anode button 58 to a main lens of the electron gun 49 and a conductive film coated on the phosphor layer of the phosphor screen 42.

The electron beams B are intensity-modulated by modulating signals such as video signals supplied by the stem pins 55, then are controlled by electrodes such as an intermediate grid electrode supplied with a specified voltage, then are subjected to color selection by the shadow mask 45 disposed immediately in front of the phosphor screen 42, and strike phosphor elements of the desired color (red, green or blue) constituting the phosphor screen 42 to thereby reproduce a specified image.

In the color cathode ray tubes of this kind, because of the cost of manufacture and ease of fabrication, the outer surface (also variously called the image-forming surface, the viewing surface and the face) of its panel portion is configured to have a large radius of curvature (or a large equivalent radius of curvature), that is, to be nearly flat, and on the other hand, the inner surface of the panel portion formed with the phosphor layer is configured to have a relatively smaller radius of curvature (or a relatively smaller equivalent radius of curvature) without impairing a sense of flatness of a picture displayed on the phosphor screen viewed from the outer surface side of the panel portion.

FIG. 5 is a side view of an essential part of the electron gun 49 provided with an internal voltage-dividing resistor and used in the color cathode ray tube shown in FIG. 4, as viewed in a direction perpendicular to a direction of the in-line arrangement of the three electron beams. The electron gun 49 for projecting the three electron beams in line is housed within the neck portion 43 of the vacuum envelope 56 of the color cathode ray tube.

The electron gun 49 includes an anode (the sixth grid electrode) 61 supplied with a highest voltage (an anode voltage), an intermediate grid electrode 62 supplied with a voltage divided from the anode voltage by the internal voltage-dividing resistor 72, a cathode structure K for emitting the three electron beams, and a focus lens comprised of the grid electrode group 63 including plural electrodes, the fourth grid electrode 64, the third grid electrode 65, the second grid electrode 66, and the first grid electrode 67 and focusing the electron beams emitted from the cathode structure K.

The electrodes 61 to 76 are fixed in the specified order with specified spacings therebetween by embedding portions of peripheries of the respective electrodes in a pair of insulating support rods 69. A shield cup 68 is attached to the sixth grid electrode 61, and springs (not shown) made of metal are welded at their respective ends to a sidewall of a front end of the shield cup 68, and the other ends of the respective springs press resiliently against the internal conductive coating 57 made of material such as graphite and extending from the inner wall of the funnel portion 44 toward that of the neck portion 43 of the vacuum envelope 56 such that the anode voltage is supplied to the sixth grid electrode 61 via the anode button 58 sealed through the funnel portion 44.

The internal voltage-dividing resistor 72 is attached to an outer surface of one of the pair of insulating support rods 69 facing the tube wall of the neck portion 43. The internal voltage-dividing resistor 72 is provided with terminals 73, 74 and 75 for electrical connections, the terminal 73 is connected to the sixth grid electrode 61 supplied with the anode voltage, the terminal 74 is connected to the intermediate grid electrode 62, and the terminal 75 is connected to the earth.

A connecting tab 73*a* is attached to the terminal 73, projects from it in a direction perpendicular to the central axis of the electron gun 49, and is connected to the sixth grid electrode 61. A connecting tab 74*a* projects from the terminal 74, is connected to the intermediate grid electrode 62, and thereby supplies a high voltage divided from the anode voltage by a factor corresponding to the ratio between the resistances in the internal voltage-dividing resistor 72 to the intermediate grid electrode 62. A connecting tab 75*a* projects from the terminal 75, is connected to one of the stem pins 55 via a connecting lead or the like, and is connected to a potential such as the ground potential (hereinafter the ground potential) via the one of the stem pins 55 outside the cathode ray tube.

A conductor 76 made of a metal wire has one end thereof connected to one electrode of the fifth grid electrode group 63, surrounds the internal voltage-dividing resistor 72 and the insulating support rod 69 mounting the resistor 72, and has the other end thereof connected to the one electrode of the fifth grid electrode group 63 on the side thereof opposite from the position at which the one end of the conductor 76 is connected, across the insulating support rod 69. After the completed gun assembly is sealed into the neck portion 43, the conductor 76 is heated by external high-frequency induction heating coil to evaporate a portion of metals contained in the conductor 76 and thereby to form a metal thin film on the inner tube wall of the neck portion 43 such that a stable potential is established on the inner tube wall of the neck portion 43 during the operation of the cathode ray tube.

It is known that an extension from a metal wire used for connecting electrodes of the same potential together within the cathode ray tube can be used as the conductor 76, and there is used another type of the conductor 76 which has only one end thereof connected to an electrode and the other end thereof free.

FIG. 6 is a cross-sectional view of an essential part of an example of the cathode structure K used in the electron gun for the color cathode ray tube shown in FIG. 5. In FIG. 6, three equally spaced eyelets 81 for green, blue and red electron beams, respectively, are embedded through an insulator 82 made of crystallized glass.

The insulator 82 is plate-like and generally rectangular with its long sides in the direction of the in-line arrangement of the three electron beams. The sidewall and the peripheral portion of the top surface of the insulator 82 are covered all around the circumference by a cup-shaped support 83. Fixed within each of the eyelets 81 is a sleeve support 85 for supporting a cathode sleeve 84. Each of the cathode sleeves 84 is provided with a cathode base metal 87 having an electron-emissive material layer 86 on a top surface thereof facing the first grid electrode 67. The cathode having the configuration shown in FIG. 6 is called the cathode of the glass-bonded type.

With this configuration of the cathode, the cathode sleeves 84, the cathode base metals 87 and the electron-emissive material layers 86 are heated by passing current through a heater (not shown) housed within the respective cathode sleeves 84, to such a high temperature that electrons are emitted from the electron-emissive material layers 86.

The crystallized glass constituting the insulator 82 used in the cathode structure K is generally made up chiefly of zinc oxide (ZnO), boron oxide ($B_2O_3$), silicon oxide ($SiO_2$) and magnesium oxide (MgO), and among various characteristics required of the insulator 82 made of the crystallized glass, it is required in particular that its resistance to heat is great and the amount of gases evolving from it is small.

The following disclose techniques related to the above-explained cathodes of the glass-bonded type.

Japanese Patent Publication No. Hei 1-46977 discloses a technique for using crystallized glass containing amorphous material and having specified its thermal expansion characteristics, Japanese Patent Publication No. Hei 1-61215 discloses a composition of crystallized glass and a firing technique using two low- and high-temperature process steps, Japanese Patent Publication No. Hei 3-15287 discloses a composition of crystallized glass, a proportion of crystal components and a ratio between x-ray diffraction peak intensities, and Japanese Patent Publication No. Hei 5-44768 discloses a composition of crystallized glass and x-ray diffraction intensity ratio between main crystalline phases. Japanese Patent Application Laid-open No. Hei 10-312757 specifies positional relationship between an insulator and a dish-shaped member for supporting the insulator therein.

SUMMARY OF THE INVENTION

The cathode structures of the glass-bonded type using crystallized glass are widely used in cathode ray tubes because of a simplified structure for supporting cathode sleeves, power saving provided by superior heat-insulating effect of the crystallized glass, and other various factors.

Conventionally, the firing conditions for crystallized glasses are determined mainly by its heat-resistant characteristics, as is apparent from the above-cited references, but suppression of evolution of gases from the cathode structures is also important, and there have been demands for the problem of the evolution of gases to be solved.

As described above, the composition for the crystallized glasses are generally made up chiefly of zinc oxide (ZnO), boron oxide ($B_2O_3$) silicon oxide ($SiO_2$) and magnesium oxide (MgO). In the process of crystallizing the composition, the boron oxide ($B_2O_3$) and the silicon oxide ($SiO_2$) compete with each other for the zinc oxide (ZnO) for forming a Zn—B—O composite oxide system substance and a Zn—Si—O composite oxide system substance, respectively, and the heat-resistant characteristics of the crystallized glasses depend upon the proportions of the formed two composite oxide system substances.

With the above composition, the proportion of the Zn—Si—O composite oxide system substance increases with increasing firing temperature, and as a result some of the boron oxide ($B_2O_3$) remains in the glass such that the heat-resistant characteristics are degraded. There have been demands for the problem of ensuring an accurate spacing between a cathode and the first grid electrode to be solved.

Further, outgassing characteristics varies with firing temperature. If the firing temperature is lowered in view of the heat-resistant characteristics, the glass cannot be outgassed completely during the firing operation, and some gases remain in the insulator. It was found out that the amount of gases evolving from the crystallized glass increases as the temperature of the cathode structure is elevated during the operation of the cathode structure, and consequently, the electron-emissive characteristics of the cathode is degraded.

As explained above, in cathode ray tubes employing a conventional cathode structure of the glass-bonded type, there have been demands for solution to the problems of improving the heat-resistant characteristics of the crystallized glass constituting the insulator for supporting the cathode sleeves and reducing the amount of gases evolving from the crystallized glass at the same time.

It is an object of the present invention to provide a cathode ray tube having superior electron-emissive characteristics and capable of securing a spacing between the cathode and the first grid electrode with high precision, by solving the above-described problems with the conventional techniques.

To solve the above-explained problems, the present invention specifies the crystalline phases of the crystallized glass constituting the insulator for supporting cathode sleeves of the cathode structure.

The following describes a representative configuration of the present invention.

In accordance with an embodiment of the present invention, there is provided a cathode ray tube comprising a vacuum envelope having a panel portion, a neck portion, and a funnel portion connecting the panel portion and the neck portion; a phosphor screen formed on an inner surface of the panel portion; an electron gun housed in the neck portion and including a cathode, a first grid electrode spaced from the cathode and a plurality of grid electrodes spaced between the first grid electrode and the phosphor screen for generating and directing an electron beam toward the phosphor screen, the first grid electrode and the plurality of grid electrodes being fixed in predetermined axially spaced relationship by a plurality of insulating support rods, and a deflection yoke mounted in the vicinity of the junction between the neck portion and the funnel portion, the cathode being supported within an eyelet disposed within and bonded to a cup-shaped support by a crystallized glass contained within the cup-shaped support, the cup-shaped support being fixed by the plurality of insulating support rods, wherein the crystallized glass is formed by firing a glass composition composed chiefly of zinc oxide (ZnO), boron oxide ($B_2O_3$), silicon oxide ($SiO_2$), and magnesium oxide (MgO), and the crystallized glass exhibits a ratio in intensity of a diffraction peak A to a diffraction peak B in a range from 0.25 to 0.80 in an X-ray diffraction analysis using x-rays of 0.154 nanometers in wavelength, where the diffraction peak A is a peak in the vicinity of 2θ=25.5°, the diffraction peak B is a peak in the vicinity of 2θ=26.5°, 2θis an angle which a diffracted X-ray beam from a specimen surface makes with an incident X-ray beam.

BRIEF DESCRIPTION OF THE DRAWINGS

In the accompanying drawings, in which like reference numerals designate similar components throughout the figures, and in which.

DETAILED DESCRIPTION OF THE PREFERRED EMBODIMENTS

The following describes the embodiments in accordance with the present invention in detail by reference to the drawings.

Figure 1:
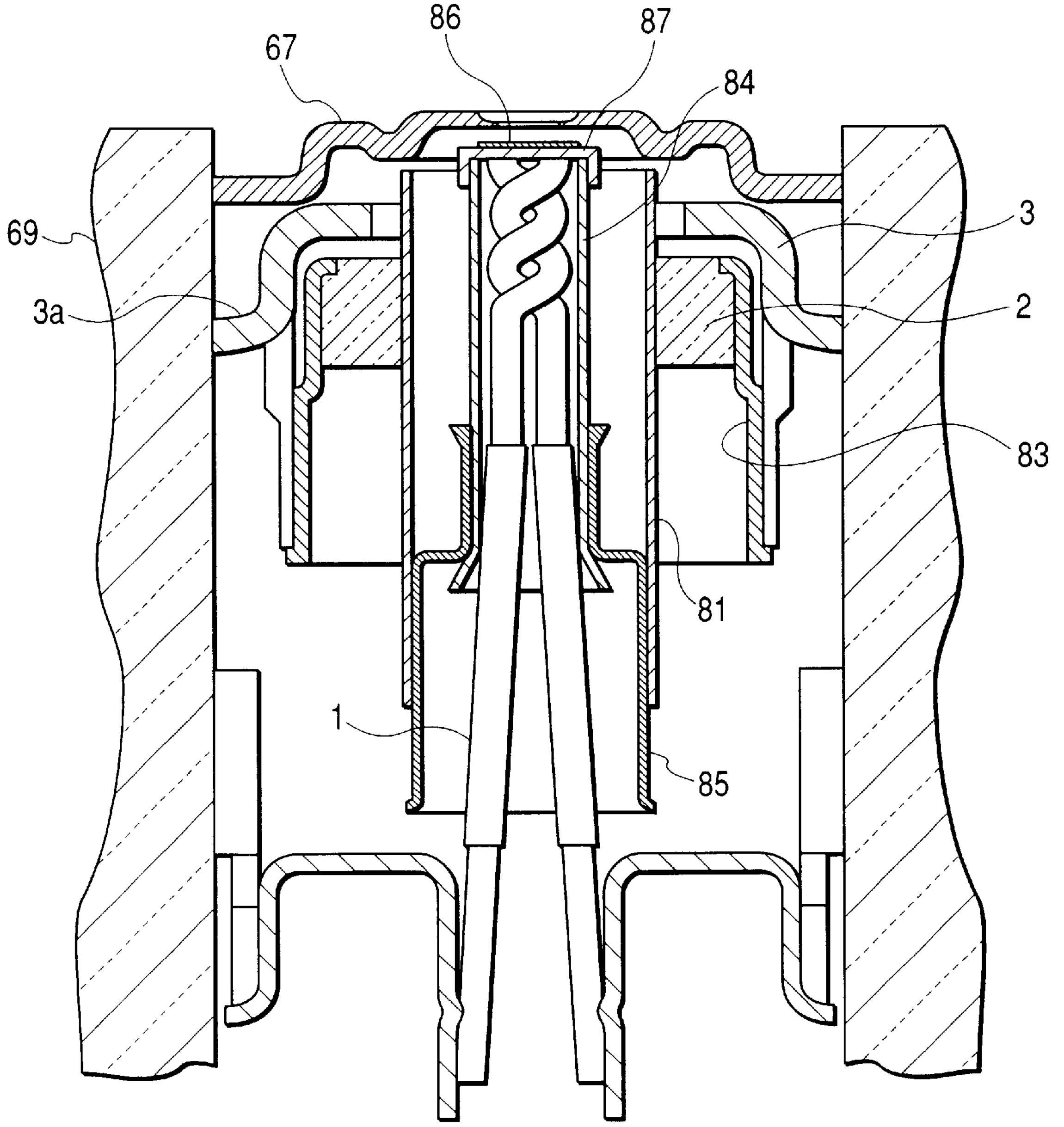
FIG. 1 is a cross-sectional view of an essential part of an embodiment of an electron gun used in a cathode ray tube in accordance with the present invention.
Figure 4:
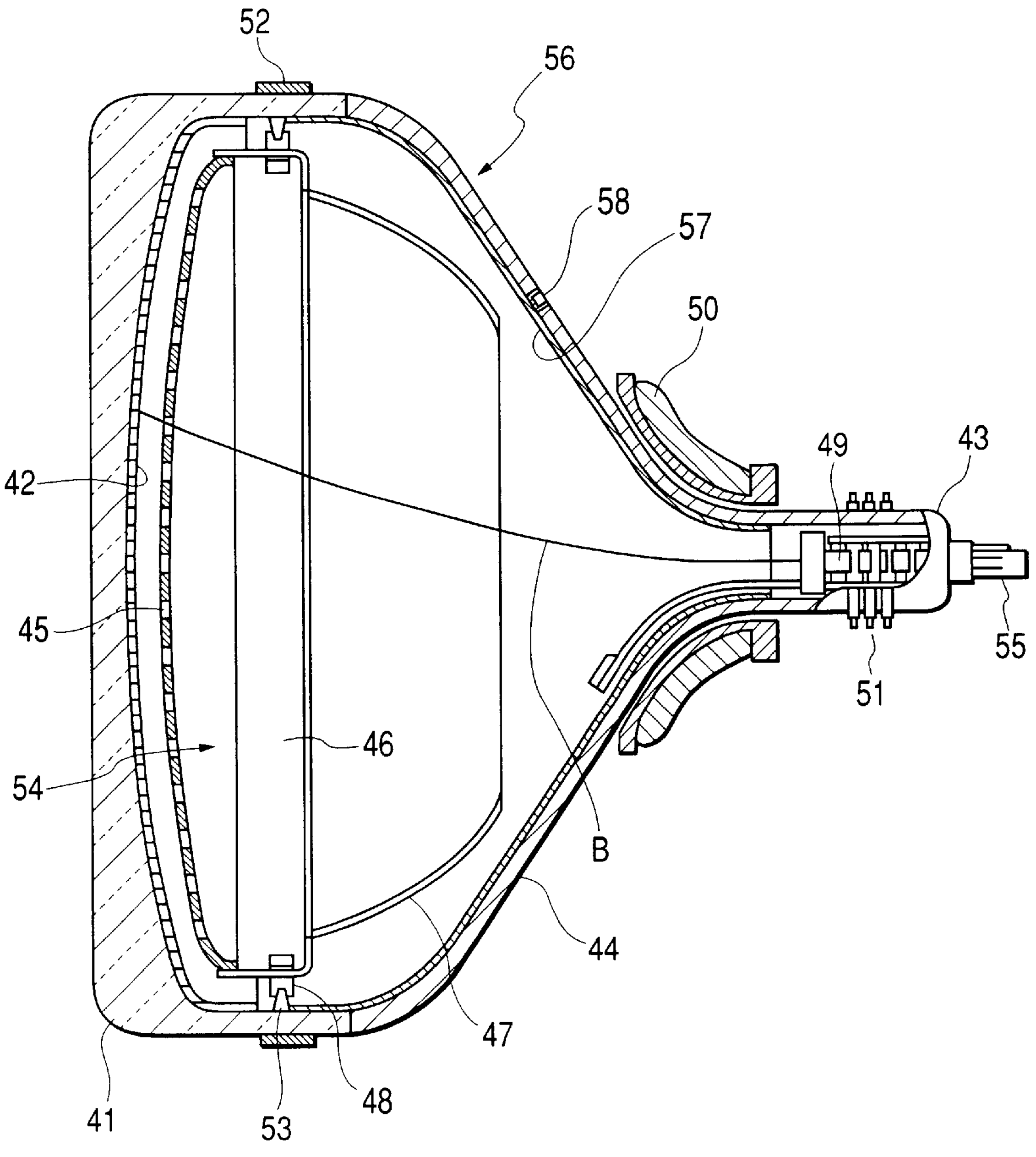
FIG. 4 is a schematic cross-sectional view illustrating an overall construction of an example of a color cathode ray tube.
Figure 5:
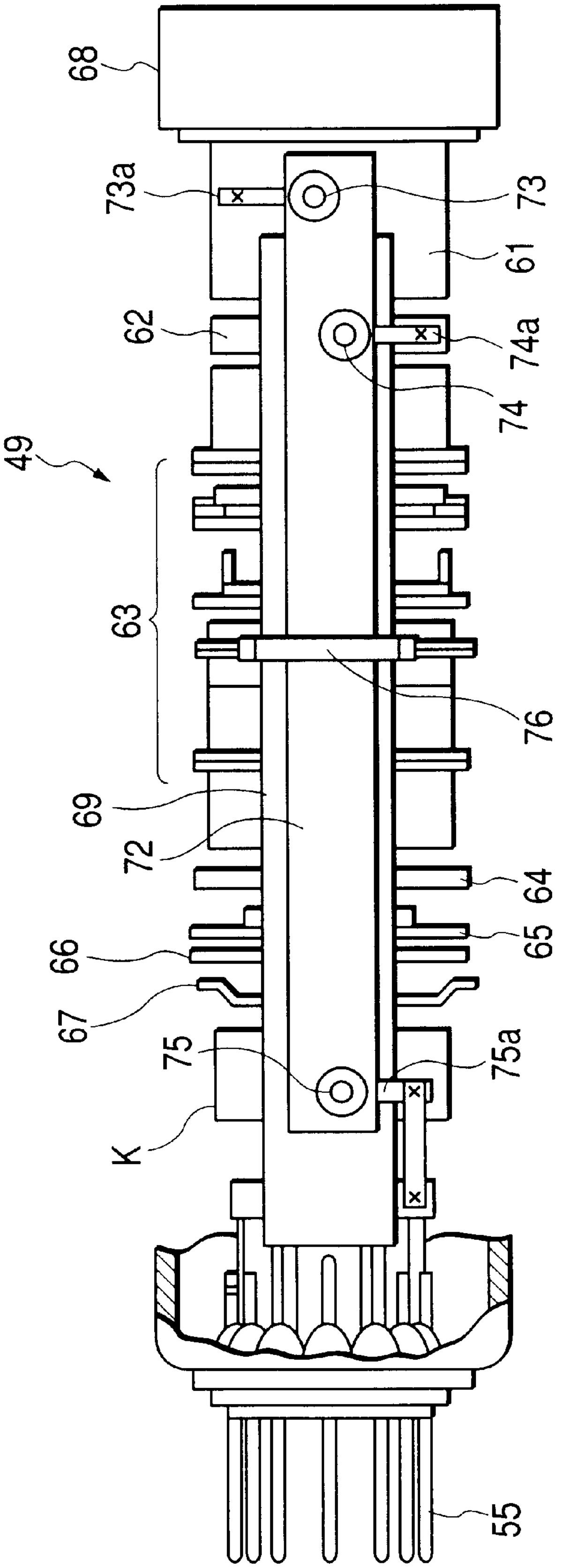
FIG. 5 is a side view of an essential part of an electron gun employing an internal voltage-dividing resistor and used in the color cathode ray tube shown in FIG. 4.
Figure 6:
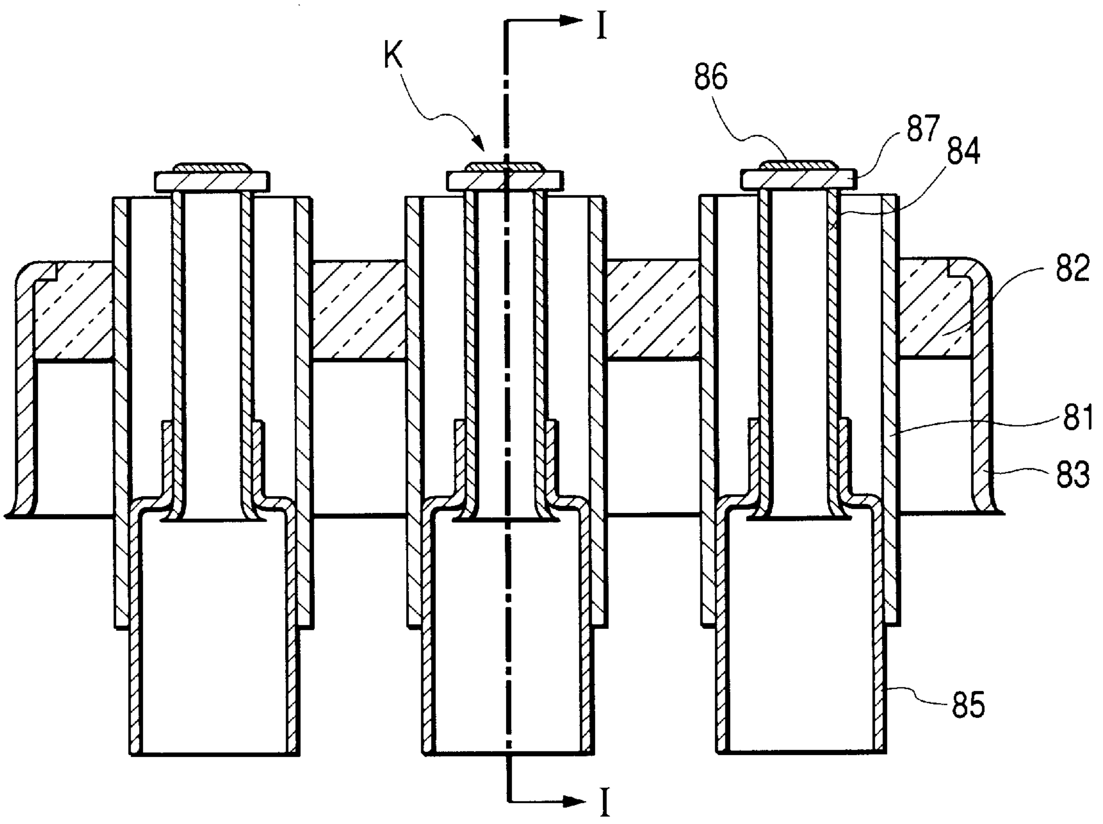
FIG. 6 is a cross-sectional view of an essential part of an example of a cathode structure used in the electron gun of the color cathode ray tube of FIG. 5.

FIG. 1 is a cross-sectional view of an essential part of an embodiment of an electron gun used in a cathode ray tube in accordance with the present invention, and is similar to a cross-sectional view of the cathode structure K of FIG. 6 taken along line I—I of FIG. 6. The same reference numerals as utilized in FIGS. 4 to 6 designate corresponding or functionally similar portions in FIG. 1.

In FIG. 1, a heater 1 is housed within a cathode sleeve 84, and the cathode sleeve 84, the cathode base metal 87 and the electron-emissive material layer 86 are heated by passing current through the heater 1 to such a high temperature that electrons are emitted from the electron-emissive material layer 86.

Reference numeral 2 denotes an insulator made of crystallized glass. The insulator 2 embeds three eyelets 81 (one for each of three electron beams, although only one is shown) therethrough, which is made of an Fe—Ni—Co alloy, for example, and the sidewall and the peripheral portion of the top surface of the insulator 2 are covered all around the circumference by the cup-shaped support 83 made of a 42 Ni—Fe alloy, for example.

Assembling of the insulator 2, the eyelets 81 and the cup-shaped support 83 will be explained in brief. First the inverted cup-shaped support 83 is inserted into a jig made of carbon, and the three inverted eyelets 81 are fixed at specified respective positions within the cup-shaped support 83. Next, inserted into a space between the support 83 and the three eyelets 81 is a tablet preformed by firing the powdered glass composition shaped in a specified form in advance, at 650° C., for example, in air. Then the glass composition tablet is fired at about 800° C. in an atmosphere of nitrogen to form the insulator 2 made of the crystallized glass for insulatingly fixing the support 83 and the three eyelets 81 in spaced relationship.

The glass composition in the form of powders comprises 60 weight percent of zinc oxide (ZnO), 25 weight percent of boron oxide ($B_2O_3$), 10 weight percent of silicon oxide ($SiO_2$), 5 weight percent of magnesium oxide (MgO), and less than or equal to 1 weight percent of aluminum oxide ($Al_2O_3$).

Reference numeral 3 denotes a cathode assembly support which is disposed to cover the cup-shaped support 83 and is connected to it, and is fixed by embedding its flange portions 3*a* in the respective insulating support rods 69.

Figure 2A:
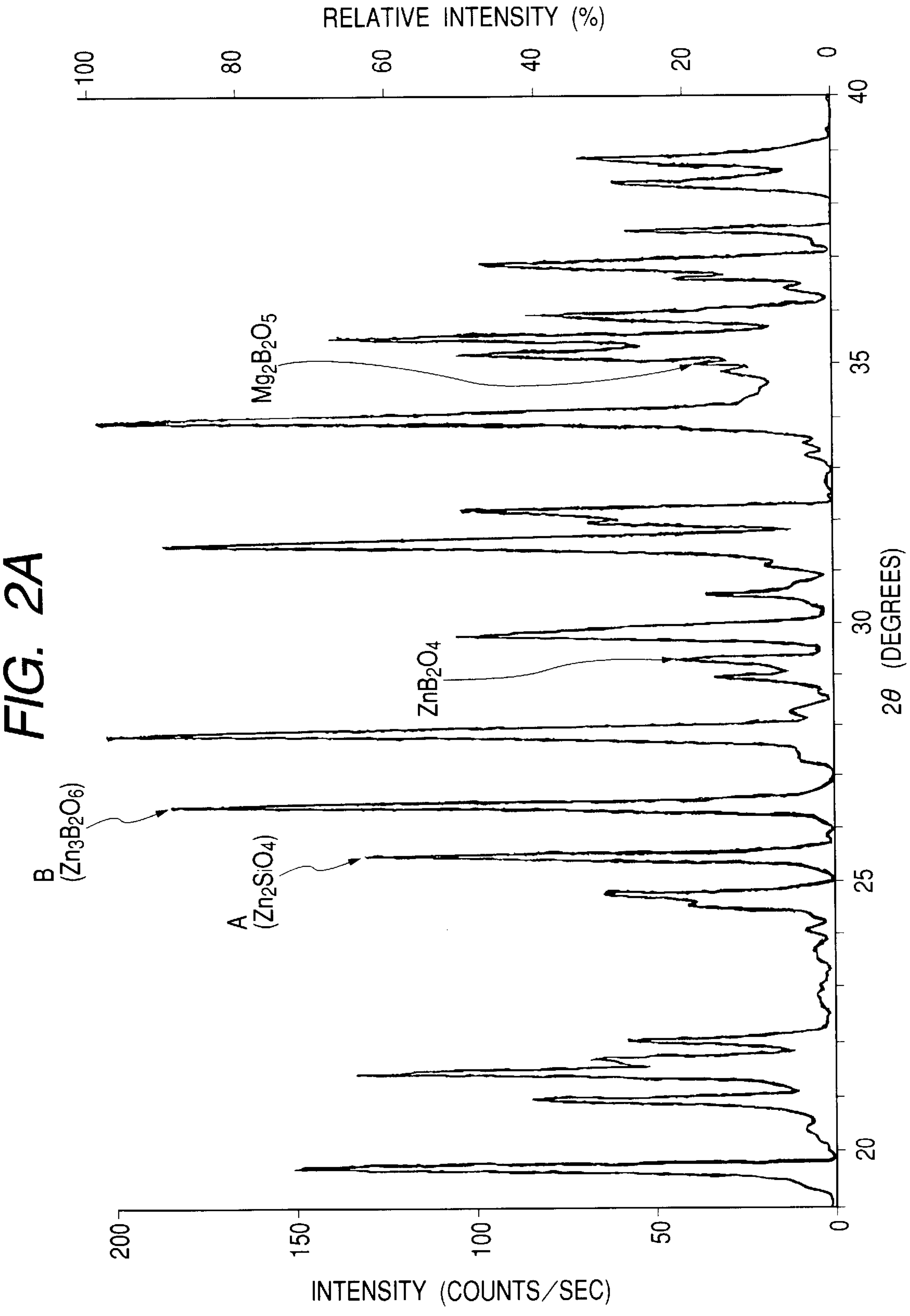
FIG. 2A is a graph showing an X-ray diffractometer pattern of crystalline phases of an insulator of a cathode structure of the electron gun of FIG. 1.
Figure 2B:
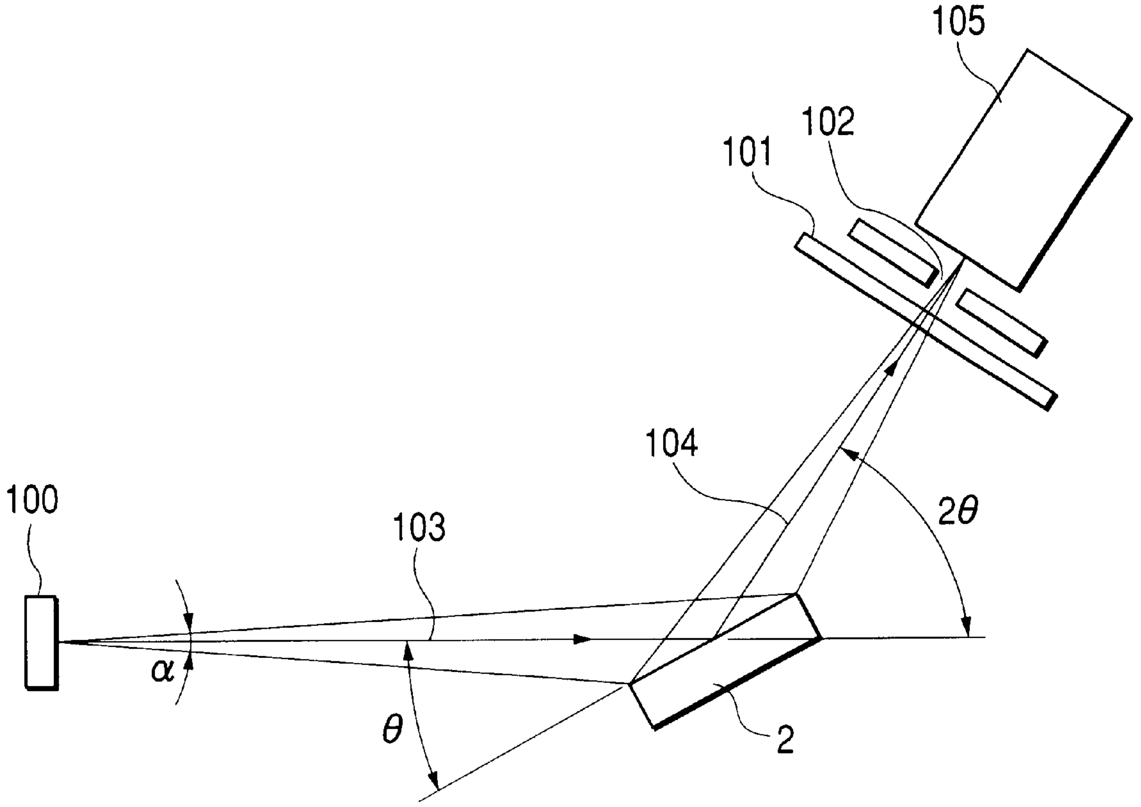
FIG. 2B is a schematic illustration for explaining an X-ray diffraction method of measuring an X-ray diffractometer pattern.

FIG. 2A is a graph showing an X-ray diffractometer pattern of crystalline phases of the insulator 2 of FIG. 1. The X-ray diffractometer pattern is measured by an X-ray diffractometer having a configuration schematically represented in FIG. 2B. In FIG. 2B, a target 100 of an X-ray tube is made of copper (Cu), a filter 101 is made of nickel (Ni), a supply voltage (not shown) for the X-ray tube is about 35 kv, a scanning speed is 2°/min, a divergence angle α of the incident X-ray beam 103 is 1°, and a receiving slit 102 is 0.15 mm wide. Diffracted X-ray beams 104 from a specimen, the crystallized glass 2, struck by X-rays of 0.154 nanometers in wavelength, were measured with an X-ray detector 105 as an angle θ is varied.

Greater detail of the X-ray diffraction analysis is contained in Sze, S. M. (ed.): "VLSI Technology," chap. 12, McGraw-Hill, New York; "McGraw-Hill Encyclopedia of Science & Technology," vol. 19 ULC-ZYT, pp. 553–571, McGraw-Hill, New York; and Kittel, C: "Introduction to Solid State Physics," chap. 2, Maruzen Co., Ltd., Tokyo. These references are hereby incorporated by reference for the purpose of including such detail.

In FIG. 2A, a diffraction peak A in the vicinity of 2θ=25.5° represents a crystalline phase of $Zn_2SiO_4$, a diffraction peak B in the vicinity of 2θ=26.5° represents a crystalline phase of $Zn_3B_2O_6$, and the ratio in peak intensity of the peak A to the peak B is 0.71, which corresponds to the ratio in amount of the $Zn_2SiO_4$ crystalline phase to the $Zn_3B_2O_6$ crystalline phase. This ratio is specified as explained subsequently.

Figure 3:
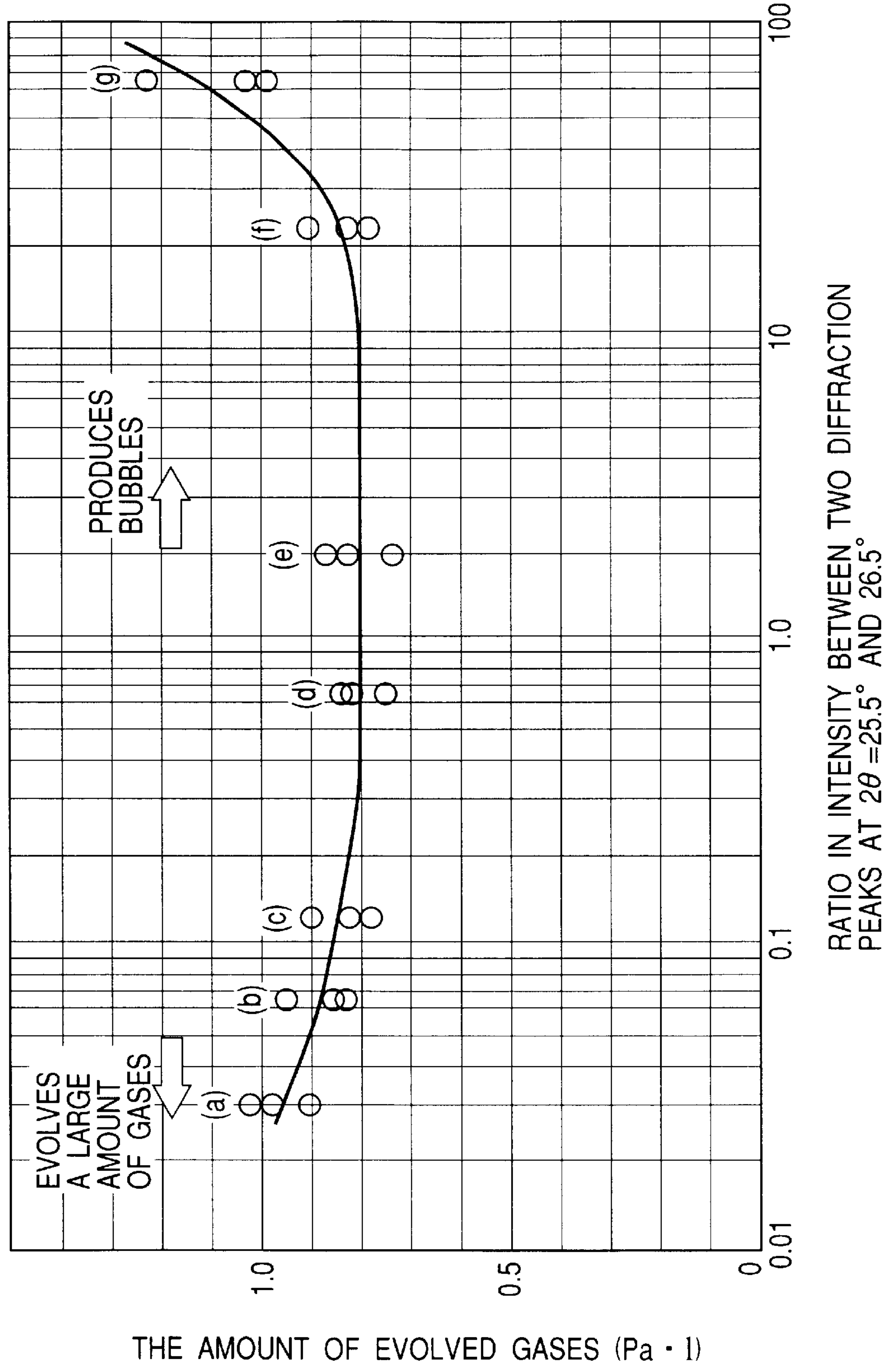
FIG. 3 is a graph showing a relationship between ratios of two diffraction peak intensities of insulators and the amount of gases evolving from the insulators.

FIG. 3 is a graph showing a relationship between ratios of diffraction peaks of the insulators and the amount of gases evolving from the insulators. The insulator samples were fabricated by firing the glass compositions at various temperatures, and then the amount of gases evolving from each of the insulator samples is measured for 15 minutes while it is kept at 850° C. In FIG. 3, the abscissa represents ratios between two X-ray diffraction peaks at 2θ=25.5° and 26.5°, respectively, of the insulators, and the ordinate represents the amount of gases evolving from the respective insulators. Each of sample groups (a) to (g) comprises three samples, and the firing temperature of each group is shown in Table 1.

TABLE 1

| Sample Groups | a | b | c | d | e | f | g |
|---|---|---|---|---|---|---|---|
| Firing Temperatures (° C.) | 765 | 775 | 785 | 800 | 810 | 820 | 835 |

As is apparent from FIG. 3, the X-ray diffraction analysis exhibits that the amount of segregation of the crystalline phase of the Zn—Si—O system increases with increasing firing temperature. And if the ratio between two x-ray diffraction peaks at 2θ=25.5° and 26.5°, respectively, is smaller than 0.25, the amount of gases evolving from the insulator increases and therefore there is possibility that electron emission characteristics of the cathode structure are adversely effected.

On the other hand, if the ratio between two X-ray diffraction peaks at 2θ=25.5° and 26.5°, respectively, exceeds 20, the amount of gases evolving from the insulator tends to increase abruptly, and there is possibility of occurrence of some problems. It might be thought that this abrupt increase of gases evolving from the insulator would be caused because the crystalline conditions of the glasses become instable and thereby bubbles confined in the glass expand and are released into vacuum.

Observation of the test samples after the measurement of gases evolving from them revealed that even if the above-described ratio between two X-ray diffraction peaks is 2.0, bubbles grow in the glasses, and their heat resistance is deteriorated.

Growth of bubbles was prevented by making the above-explained ratio between the two X-ray diffraction peaks less than or equal to 0.80.

Consequently, it is desirable that the above-described ratio between two X-ray diffraction peaks is in a range from 0.25 to 0.80. Productivity, suppression of evolution of gasses, and heat resistance are improved in the assembly comprised of the support 83, the eyelets 81 and the insulator 2.

It is to be noted that although the maximum peak corresponding to $Zn_2SiO_4$ is present at 2θ=31.5°, it overlaps with other peaks, and is not easily distinguishable from them, and therefore the peak at 2θ=25.5° was adopted, and likewise although the maximum peak corresponding to $Zn_3B_2O_6$ is present at 2θ=28.0°, the peak at 2θ=26.5° was adopted for the same reason.

It is preferable that the crystallized glass is formed by firing the glass composition shown below.

| | |
|---|---|
| zinc oxide (ZnO) | 58 to 68 weight percent |
| boron oxide ($B_2O_3$) | 20 to 26 |
| silicon oxide ($SiO_2$) | 8 to 13 |
| magnesium oxide (MgO) | 4 to 9 |
| aluminum oxide ($Al_2O_3$) | less than or equal to 1 |

The present invention is not limited to the configurations of the above embodiment, and various changes and modifications may be made without departing from the spirit and scope of the invention as defined in the appended claims.

As described above, the present invention specifies the crystalline phases of the crystallized glass constituting the insulator for supporting cathode sleeves of a cathode ray tube, and thereby the present invention is capable of providing gas-evolution-suppressing characteristics required of the cathode structure and heat-resistant characteristics sufficient to withstand heats produced during manufacturing processes of the cathode ray tube and operation of the completed cathode ray tube, and consequently, the present invention is capable of providing the cathode ray tube superior in electron emission characteristics and in establishing a spacing between its cathodes and its first grid electrode with high precision.

What is claimed is:

1. A cathode ray tube comprising a vacuum envelope having a panel portion, a neck portion, and a funnel portion connecting said panel portion and said neck portion;

a phosphor screen formed on an inner surface of said panel portion;

an electron gun housed in said neck portion and including a cathode, a first grid electrode spaced from said cathode and a plurality of grid electrodes spaced between said first grid electrode and said phosphor screen for generating and directing an electron beam toward said phosphor screen, said first grid electrode and said plurality of grid electrodes being fixed in predetermined axially spaced relationship by a plurality of insulating support rods, and a deflection yoke mounted in the vicinity of the junction between said neck portion and said funnel portion, said cathode being supported within an eyelet disposed within and bonded to a cup-shaped support by a crystallized glass contained within said cup-shaped support, said cup-shaped support being fixed by said plurality of insulating support rods, wherein said crystallized glass is formed by firing a glass composition composed chiefly of zinc oxide (ZnO), boron oxide ($B_2O_3$), silicon oxide ($SiO_2$), and magnesium oxide (MgO), and said crystallized glass exhibits a ratio in intensity of a diffraction peak A to a diffraction peak B in a range from 0.25 to 0.80 in an X-ray diffraction analysis using X-rays of 0.154 nanometers in wavelength, where said diffraction peak A is a peak in the vicinity of 2θ=25.50°, said diffraction peak B is a peak in the vicinity of 2θ=26.50°, 2θ is an angle which a diffracted X-ray beam from a specimen surface makes with an incident X-ray beam.

2. A cathode ray tube according to claim 1, wherein said diffraction peak A represents a crystalline phase of $Zn_2SiO_4$, and said diffraction peak B represents a crystalline phase of $Zn_3B_2O_6$.

3. A cathode ray tube according to claim 1, wherein said glass composition is composed of 58 to 68 weight percent of zinc oxide (ZnO), 20 to 26 weight percent of boron oxide ($B_2O_3$), 8 to 13 weight percent of silicon oxide ($SiO_2$), 4 to 9 weight percent of magnesium oxide (MgO), and less than or equal to 1 weight percent of aluminum oxide ($Al_2O_3$).

4. A cathode ray tube according to claim 2, wherein said glass composition is composed of 58 to 68 weight percent of zinc oxide (ZnO), 20 to 26 weight percent of boron oxide ($B_2O_3$), 8 to 13 weight percent of silicon oxide ($SiO_2$), 4 to 9 weight percent of magnesium oxide (MgO), and less than or equal to 1 weight percent of aluminum oxide ($Al_2O_3$).

5. A cathode ray tube according to claim 1, wherein said glass composition includes aluminum oxide ($Al_2O_3$).

6. A cathode ray tube according to claim 2, wherein said glass composition includes aluminum oxide ($Al_2O_3$).

7. A cathode ray tube according to claim 3, wherein said glass composition includes aluminum oxide ($Al_2O_3$).

8. A cathode ray tube according to claim 4, wherein said glass composition includes aluminum oxide ($Al_2O_3$).

* * * * *